June 13, 1967     A. M. CASTELLO     3,325,193
AIR PIPE CONNECTOR

Filed Oct. 19, 1964     2 Sheets-Sheet 1

INVENTOR:
ANTHONY M. CASTELLO
BY
Dawson, Tilton, Fallon, Lungmus & Alexander
ATT'YS June 13, 1967  A. M. CASTELLO  3,325,193
AIR PIPE CONNECTOR Filed Oct. 19, 1964  2 Sheets-Sheet 2

INVENTOR:
ANTHONY M. CASTELLO
BY
Dawson, Tilton, Fallon, Lungmus & Alexander
ATT'YS

United States Patent Office 3,325,193
Patented June 13, 1967

3,325,193
AIR PIPE CONNECTOR
Anthony M. Castello, Wichita, Kans., assignor to The Coleman Company, Inc., Wichita, Kans., a corporation of Kansas
Filed Oct. 19, 1964, Ser. No. 404,574
2 Claims. (Cl. 285—189)

This invention relates to an air pipe connector, and more particularly to a connector for attaching an air pipe to a furnace bonnet or air circulation duct. The connector of the present invention has particular utility where the air pipe must connect with a bonnet or duct having a flat sheet metal wall into which a generally circular opening is cut. A typical application is to provide the take-off connectors for a furnace bonnet where a plurality of air distribution pipes are utilized.

The connection of air pipes to furnace bonnets and air distribution ducts is a common problem. There has been little improvement in the design of connectors for many years. The connector which has become more or less standard for this purpose is a tubular fitting having one end adapted to connect to the air pipe and the other to the flat wall of the bonnet or duct. The bonnet or duct end of the connector is provided with an integral outwardly extending flange which is continuous around the entire circumference of the connector. To this is attached a ring which on its inside provides a plurality of attachment fingers or tabs. To attach the connector to the bonnet or duct, it is necessary to cut a circular opening with considerable care and accuracy. Since a number of such openings are usually required and they are normally cut on the job, there is always danger of cutting the openings improperly with the result of a loose or sloppy fit, or in extreme cases of even spoiling the bonnet or duct, requiring its replacement. After the precisely sized opening has been cut, the flange of the connector is brought up against the outer wall of the bonnet or duct with the tabs extending through the opening. These tabs are then bent back against the inner surface of the wall to lock the connector in place. All of these steps require considerable time, and it is necessary to have access to the inside of the bonnet or duct to bend the tabs to complete the assembly.

It is therefore an object of the present invention to provide an air pipe connector which substantially overcomes the problems and difficulties described above. More specifically, it is an object to provide a connector of the character described where only a generally circular opening in the wall of the bonnet or duct is required and where the opening need not be sized with great accuracy, thereby permitting the openings to be cut more rapidly and by less experienced workmen. A further related object is to provide a connector of less expensive construction which eliminates the tab-bearing ring, and the need for bending or forming the tabs to complete the attachment. Still another object is to provide a connector which can be attached from the outside by a simple motion without requiring any tools, or the bending or forming of any flanges, tabs, or other elements. Further objects and advantages will be indicated in the following detailed specification.

This invention is shown in illustrative embodiment in the accompanying drawings, wherein—

Figure 1:
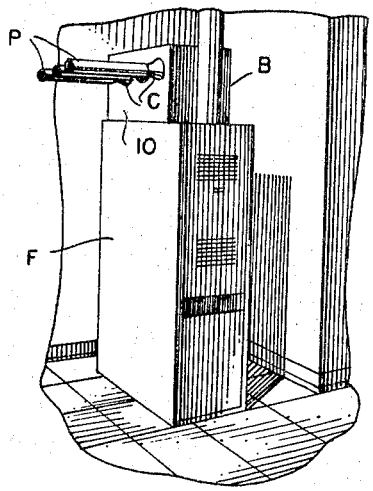
FIGURE 1 is a perspective elevational view of an up-flow forced air furnace having a bonnet on its top to which are attached a plurality of distribution ducts by means of the connector of this invention.
Figure 5:
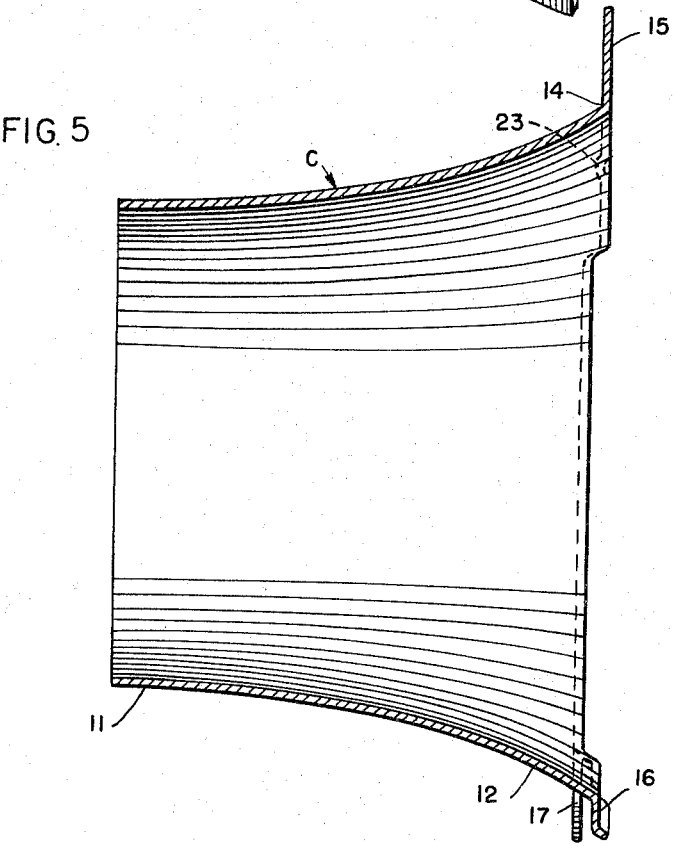
FIGURE 5 is a vertical side sectional view of the connector.

Looking first at FIGURE 1, there is shown an up-flow forced air furnace F having a bonnet B to which are attached a plurality of air distribution pipes P by means of connectors C which attach to a flat sheet metal wall 10. It will be understood that this illustrates only one of the many possible applications of the connectors C, which generally may be employed for attaching air pipes to furnace bonnets or air distribution ducts having flat sheet-metal walls. As indicated in FIGURE 1, the outer ends of the connectors are adapted for attachment to the pipes. Any suitable attachment means may be used, such as clamping rings, quick connectors with wedge-type locking means, etc. As indicated more clearly in FIGURE 5 the outer end 11 of the connector may be provided with a straight cylindrical section to facilitate mating this end section with a pipe or connector ring.

Connector C is in the form of a tubular open-ended member. In the embodiment shown, the connector enlarges in cross section from the outer pipe end 11 to the inner wall attachment end 12. While this flaring construction is desirable, it is not essential for achieving the benefits of the present invention. Further, either end portion 11 or end portion 12 may be varied in cross sectional shape, providing the air pipe to which end 11 connects, or the opening in wall 10 to which end portion 12 connects, is correspondingly varied.

In accordance with the present invention, the wall end 12 of the connector is provided with flange means for achieving the rapid attachment of the connector to the wall into which an opening has been cut, such as the opening 13 in wall 10. Preferably, the flange means extends outwardly to a diameter greater than that of the opening 13. It will be understood, of course, that the opening will be cut to the approximate size required for the particular connector. One of the advantages of the present invention is that the opening need not be a true circle, and may vary in diameter between the diameter of the inner edge of the flange means, as indicated at 14, and the outer maximum diameter of the flange means.

The construction of the flange means will now be more specifically described by reference to the particular embodiment shown in the drawings. The flange means is divided into two pairs of oppositely disposed sections 15, 16 and 17, 18. These sections are respectively separated by the slots 19, 20, 21 and 22. The slots extend inwardly from the outer periphery of the flange sections. In the illustration given, the slots extend substantially to the inner edge 14 of the flange means.

The flange sections 15, 16, lie in substantially the same plane, while the sections 17, 18, lie in another plane which is axially offset with respect to the plane of the sections 15, 16. Preferably, the offset between the planes of the pairs of sections is approximately the thickness of the sheet metal wall to which the connector is to be attached. The sections 17, 18, are offset toward the pipe end of the connector, while the sections 15, 16, lie in a plane coinciding with the termination of the wall end portion of the connector. This arrangement permits the axially outer sections 15, 16, to bear against the inside surface of the wall 10 while the axially inner sections 17, 18, bear against the outside surface of this wall with the connector in attached position.

Preferably, section 15 extends outwardly further than section 16. Further, the distance from the inside of section 15 to the outside of section 16 is less than the diameter of the opening in the wall to which the connector is to be attached. As will subsequently be explained, this facilitates the insertion of the sections through the opening. It will be understood that the opening will be formed with this assembly in mind. The width of the flanges, 17, 18 is not particularly critical, but the distance from the outer edge of flange 17 to the outer edge of flange 18 should be substantially greater than the diameter of the opening in the wall.

Figure 2:
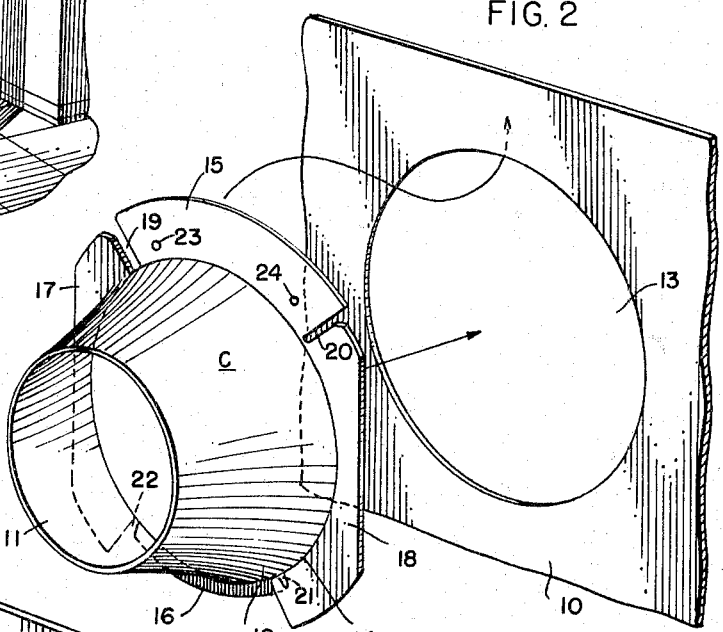
FIGURE 2 is a perspective view of the connector showing it in separated relation to the bonnet wall into which a generally circular opening has been cut.
Figure 3:
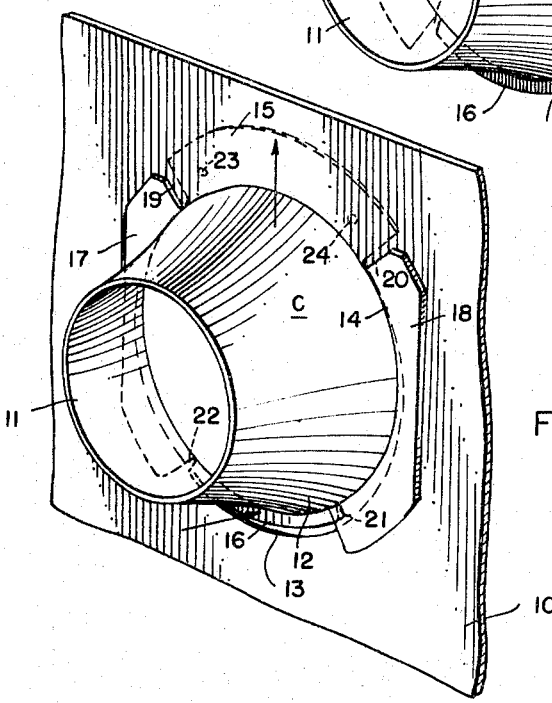
FIGURE 3 is a perspective view of the connector and bonnet wall illustrating the first step in attaching the connector.

In the use of the connector, opening 13 may be formed in the wall 10 as illustrated in FIGURE 2. The connector is then brought up to the wall as indicated by the arrow in FIGURE 2. The flange 15 may be tipped inwardly slightly to permit its insertion through opening 13. Flange 15 is then moved upwardly behind the wall 10 with the front face of the flange in contact with the rear surface of the wall so that the wall edges enter the slots 19 and 20. When the flange 15 has been moved upwardly as far as it will go, the wall edges will be near the bottom of the slots 19 and 20. At this point, the outer edge of the flange 16 will be inside of the edge of the opening 13, thereby permitting it to move through the opening as indicated in FIGURE 3. The connector can then be pulled downwardly with the front face of flange 16 bearing against the rear surface of wall 10 to achieve the condition illustrated in FIGURE 4. In this position, both of the flanges 15, 16, are behind the wall 10, while the flanges 17, 18, are in front of the wall, thereby attaching the connector to the wall and preventing it from being pulled outwardly from the wall without first moving it upwardly to release the lower flange 16.

Figure 4:
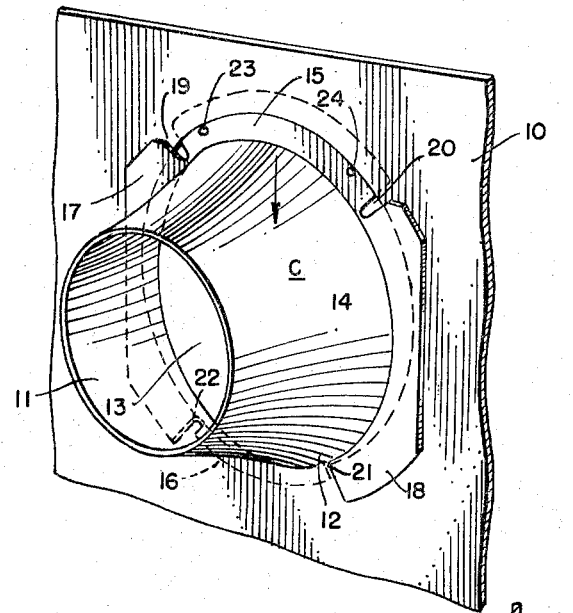
FIGURE 4 is a perspective view similar to FIGURE 3 illustrating the final step in attaching the connector.

Various means may be provided for locking or fastening the connector in assembled relation to the wall. One preferred means is to equip the flange 15 with at least one latching projection on the outer surface thereof. For example, in the illustration given the intermediate portion of flange 15 is provided with two spaced-apart outwardly extending projections 23 and 24. As shown more clearly in FIGURE 5, the projections may be conveniently formed in the flange 15 by a punching or stamping operation to form raised dimples comprising the projections 23, 24. It will be understood that the construction of these projections may be varied considerably. The latching projections should be located so that the projections may extend into the wall opening adjacent the inner edge of the wall opening when the connector is in completely assembled condition. The projections are positionable to bear against the inner edge of the wall opening to prevent flange 15 from shifting radially outwardly when the connector is attached. To accomplish this, the projections can be located so that the distance from the latching projections to the inside of the flange 16 is just slightly less than the corresponding diameter of the wall opening. This provides for maximum locking action since the lower edge of the opening may bear against connector end portion 12 while the upper edge of the opening bears against the projections 23, 24, as illustrated in FIGURE 4. It will be understood that the projections will be behind the wall 10 during the initial insertion step, as illustrated in FIGURE 3, and therefore the projections should not be so high as to interfere with this operation. In practice, they need be no higher than the thickness of the wall 10. In the final assembly step, as the connector is pulled downwardly with the flanges 15, 16, sliding behind the wall (FIG. 4), the projections 23, 24, will snap out through the opening 13 as soon as they clear the edge of the wall 10, thereby achieving a secure lock at the completion of the assembly motion. The ease and convenience of this type of assembly will therefore be readily appreciated.

While in the foregoing specification this invention has been described in relation to a preferred embodiment thereof and many details have been set forth for purpose of illustration, it will be apparent of those skilled in the art that the invention is capable of being used in other embodiments and that certain of the details set forth herein can be varied considerably without departing from the basic principle of the invention.

I claim:

1. A unitary, thin, sheet metal connector for attaching an air pipe to a bonnet or duct having a flat, thin sheet metal wall, comprising a tubular open-ended member one end of which connects to said air pipe and the other end to said wall in alignment with an opening therethrough, the wall end of said connector being provided with flange means positionable in generally parallel relation to said wall and extending outwardly from the outside of said connector at a diameter less than said opening to a diameter greater than said opening, said flange means comprising two pairs of oppositely disposed sections divided by slots extending radially inwardly from the outer periphery thereof, the sections of one pair lying in a plane axially offset from the plane of the other pair by approximately the thickness of said sheet metal wall, the axially outer pair of said sections being positionable to bear against the inside of said wall while the axially inner pair of sections bears against the outside thereof, said outer pair having one section extending radially outwardly further than the other section, the distance from the inner edge of said section of greater extent to the outer edge of the other section of smaller extent being less than the diameter of said opening to facilitate the insertion of said sections through said opening, said section of greater extent being provided with at least one fixed latching projection located on a radially intermediate portion thereof and projecting axially toward the plane of said inner pair of sections, the outer end of said latching projection slidably engaging the side of said sheet metal wall adjacent said section of greater extent while said section of smaller extent is being inserted through said wall opening, said projection being positionable after said insertion to extend into said wall opening with its side engaging the inner edge of said opening to prevent said section of greater extent from shifting radially outwardly after the attachment of said connector to said wall.

2. A unitary, thin, sheet metal connector for attaching an air pipe to a bonnet or duct having a flat sheet metal wall into which a generally circular opening is cut, comprising a tubular open-ended member one end of which connects to said air pipe and the other end to said wall in alignment with said opening, the wall end of said member being provided with flange means extending radially outwardly from the diameter less than said opening to a diameter greater than said opening, said flange means comprising two pairs of oppositely disposed sections divided by slots extending inwardly from the outer periphery thereof, the sections of one pair lying in a plane axially offset from the plane of the other pair by approximately the thickness of said sheet metal wall, the axially outer pair of said sections being positionable to bear against the inside of said wall while the inner pair of said sections bears against the outside thereof, said outer pair having one section extending radially outwardly further than the other section, the distance from the inside of said section of greater extent to the outside of the other section of smaller extent being less than the diameter of said opening to facilitate the insertion of said sections through said opening, said section of greater extent having a pair of circumferentially spaced-apart integral projections formed from the material of said section, said projections being located in a radially intermediate position on said flange section, the distance from said integral projections to the inside of said section of lesser extent being less than the diameter of said opening so that said projections may extend into said opening and bear against the edge of said wall opening when said inner pair and said outer pair are engaging their respective wall surfaces.

References Cited

UNITED STATES PATENTS

| | | | |
|---|---|---|---|
| 1,186,953 | 6/1916 | Stewart | 285—194 X |
| 1,526,375 | 2/1925 | Riegel | 285—203 X |
| 1,688,853 | 10/1928 | Clayton | 285—194 |
| 1,754,066 | 4/1930 | Tefft | 285—158 |
| 2,379,752 | 7/1945 | Schultz | 285—209 X |
| 2,907,592 | 10/1959 | Bailey | 285—424 X |

CARL W. TOMLIN, *Primary Examiner.*

THOMAS F. CALLAGHAN, *Examiner.*